Sept. 3, 1946. F. M. ASPIN 2,407,127
DRIVING MEANS FOR ROTARY VALVES OF INTERNAL-COMBUSTION
ENGINES, COMPRESSORS AND THE LIKE
Filed May 19, 1944 2 Sheets-Sheet 2
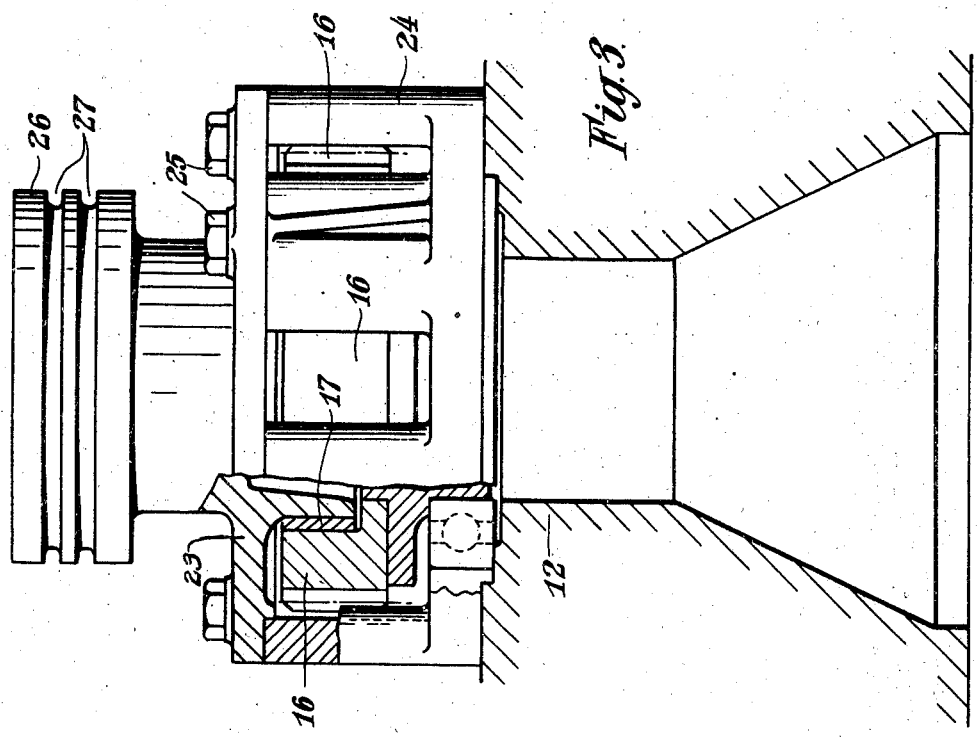
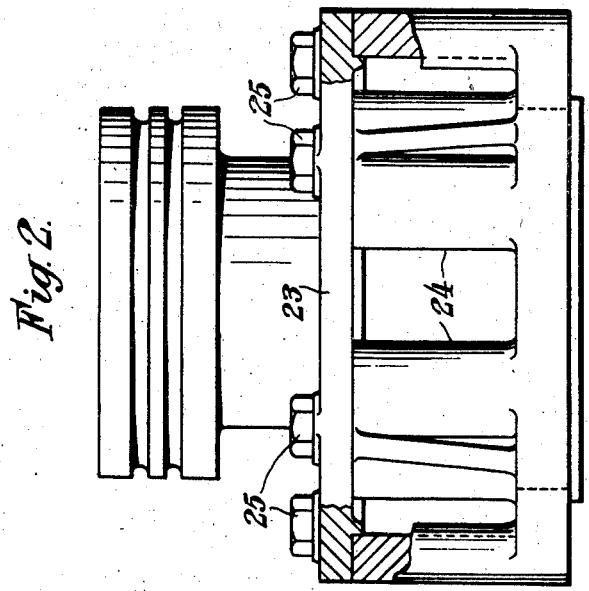
INVENTOR:
Frank M. Aspin
By Attorney: Walter Gunn

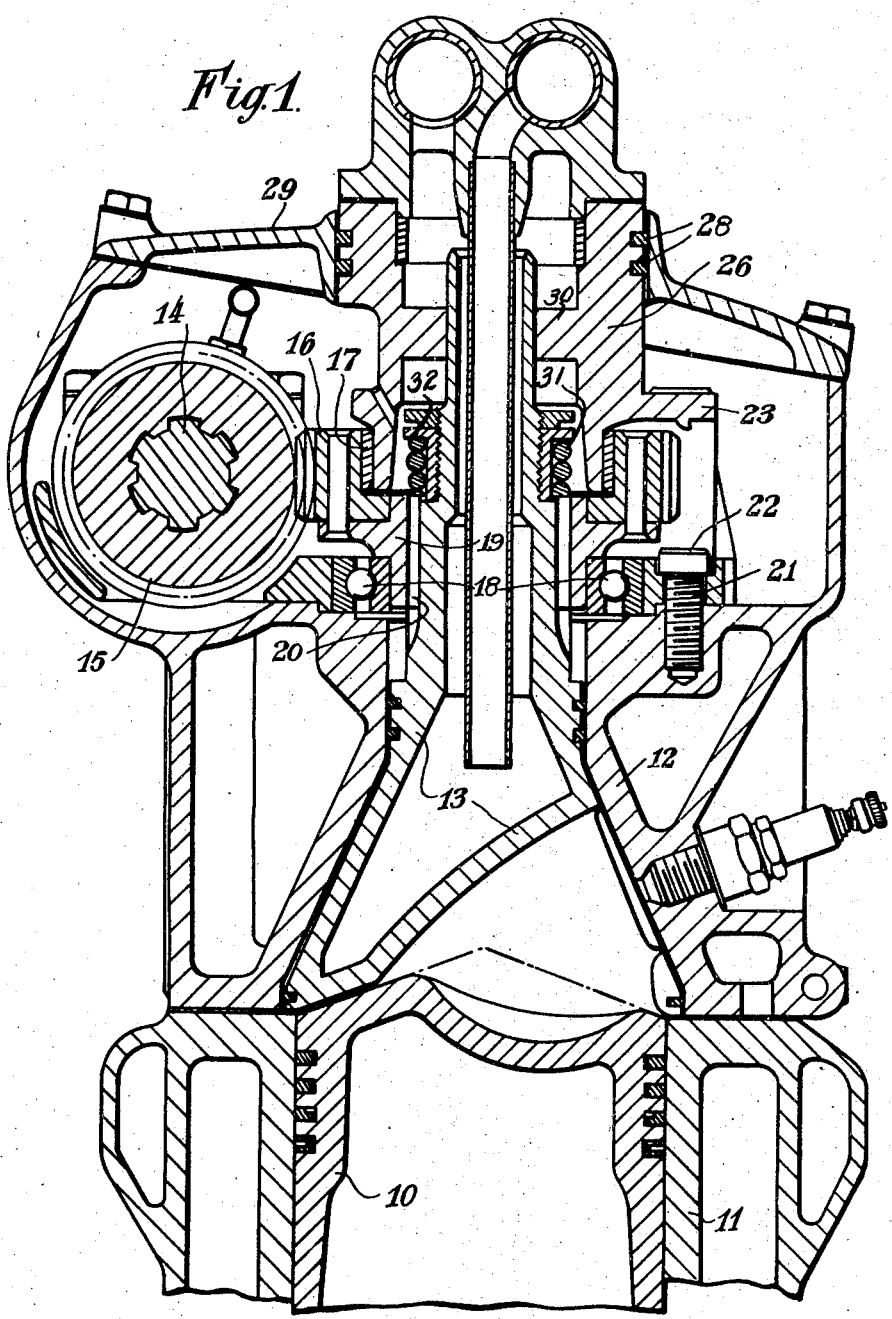

UNITED STATES PATENT OFFICE 2,407,127

DRIVING MEANS FOR ROTARY VALVES OF INTERNAL-COMBUSTION ENGINES, COMPRESSORS, AND THE LIKE

Frank Metcalf Aspin, Bury, England

Application May 19, 1944, Serial No. 536,328
In Great Britain March 12, 1943

7 Claims. (Cl. 123—80)

This invention relates to driving means for rotary valves of internal combustion engines, compressors and the like and is particularly, but not exclusively applicable to rotary valves of the kind described in the specification of my earlier Patent No. 2,283,594, and in the specifications of several of my subsequent patents and patent applications in which the complementary gas-sealing and bearing surfaces of the rotary valve member and its housing are of tapered shape, preferably conical.

In the construction of such rotary valve mechanism as described and illustrated in the specifications, of my earlier patents and patent applications, the rotary valve is driven by a gear wheel, secured to the stem of the valve.

The object of the invention is an improved construction of driving mechanism for a rotary valve.

According to the invention driving means are provided for the rotary valve member comprising a driving member arranged substantially coaxially relative to the rotary valve member, bearing means for such driving member separate from that of the rotary valve member, and complementary slidably inter-engaging driving parts on the driving member and rotary valve member permitting some freedom of self-alignment and axial displacement of the rotary valve member relative to the driving member and vice-versa.

The accompanying drawings illustrate the upper end of an internal combustion engine having driving means for the rotary valve member in accordance with one example of the invention in which Fig. 1 is a sectional elevation and Figs. 2 and 3 are side elevational views, some parts being omitted and some parts being shown in section for clearness.

As shown in the drawings, the internal combustion engine comprises a piston 10, cylinder 11, valve housing 12 and rotary valve member 13, the complementary bearing and gas sealing surfaces of the valve member and housing being conical and the rotary valve member being substantially as described in my prior Patent No. 2,283,594, aforesaid.

The valve housing includes bearings at one side for a driving shaft 14 carrying, for each rotary valve, a helical multi-start driving wheel 15. Secured to the housing is a bearing assembly carrying a complementary gear wheel 16 and comprising an upper plain bearing including a bush 17 secured in the gear wheel 16 and a lower anti-friction ball bearing 18. The gear wheel 16, which forms the driving member for the rotary valve member, is of two-part construction so that different and most suitable materials may be used for their respective functions, the hub part 19 having splines 20 to engage complementary splines on the stem of the valve. These splines are made with a certain clearance to permit relative movement.

The gear wheel 16 is located in a bearing housing which is shown in detail in Figs. 2 and 3 and comprises a lower part 21, adapted to be secured by bolts 22 (see Fig. 1) to the valve housing 12, and an upper part 23 adapted to be located on and secured to pillars 24 of the lower part by bolts 25. The upper part 23 includes a hub 26 which is formed with grooves 27 to hold rubber sealing rings 28 adapted to engage a flange in a cover plate 29. Internally, the hub 26 is adapted at 30 to form a guide and seal for the upper end of the valve stem. A coil spring 31 surrounds the stem, the lower part bearing against said splines, and the upper part bearing against an adjustable member 32. This maintains the desired contact pressure between the valve and its housing.

In use, owing to the provision of the bearings 17 and 18 and the clearance at the driving splines all thrust and lateral stresses at the driving wheel 16 are taken on such bearings and are not transmitted to the stem of the rotary valve member. Also some error of alignment is possible so that the valve member is permitted relative freedom of movement for self-alignment on its bearing surfaces, which freedom of movement is of great value in maintaining the efficiency of the complementary conical gas-sealing and bearing surfaces of the rotary valve member and housing. Obviously the splines forming the inter-engaging driving parts between the driving member (gear 16) and the rotary valve member also permit relative axial movement of the rotary valve member.

The two parts 21 and 23 of the bearing housing are adapted to be assembled as a unit with the bearings and gear wheel in situ so that it may be fitted to the engine as unit, and if necessary removed and replaced by a new unit by means only of the screws 22.

The invention is obviously not limited to all the details of construction of the example above described. For instance, the construction of the rotary valve member and housing may be different from that described and illustrated and different types of bearings may be used in place of the combination of plain and anti-friction bearings above described.

What I claim is:

1. A rotary valve assembly for internal combustion engines, compressors and the like comprising a housing having a conical valve seating, a rotary valve member having a stem part and a conical head at one end of the stem complementary to said conical seating, a pinion hub, longitudinal internal splines on said hub, external longitudinal splines on said stem, a pinion on said hub, a pair of bearings mounted on said hub and pinion, said hub, pinion and bearings constituting an assembled unit, a driving gear mounted laterally of said pinion in said unit, said splines being directly in mesh and permitting relative lateral and axial freedom of movement of the said stem and driving pinion so that the rotary valve member may at all times find its effective seating position whilst lateral or other thrust on the driving pinion is taken by the bearings.

2. A rotary valve assembly for internal combustion engines, compressors and the like comprising a housing having a conical valve seating, a rotary valve member having a stem part and a conical head at one end of the stem complementary to said conical seating, a pinion hub, longitudinal internal splines on said hub, external longitudinal splines on said stem, a pinion on said hub, a pair of bearings mounted on said hub and pinion, said hub, pinion and bearings constituting an assembled unit, a driving gear mounted laterally of said pinion in said unit, said splines being directly in mesh and permitting relative lateral and axial freedom of movement of the said stem and driving pinions so that the rotary valve member may at all times find its effective seating position whilst lateral or other thrust on the driving pinion is taken by the bearings, a bearing housing separate from and located on and secured to said valve housing, said bearings for said driving pinion contacting with said bearing housing.

3. A rotary valve assembly for internal combustion engines, compressors and the like comprising a housing having a conical valve seating, a rotary valve member having a stem part and a conical head at one end of the stem complementary to said conical seating, a pinion hub, longitudinal internal splines on said hub, external longitudinal splines on said stem, a pinion on said hub, a pair of bearings mounted on said hub and pinion, said hub, pinion and bearings constituting an assembled unit, a driving gear mounted laterally of said pinion in said unit, said splines being directly in mesh and permitting relative lateral and axial freedom of movement of the said stem and driving pinion so that the rotary valve member may at all times find its effective seating position whilst lateral or other thrust on the driving pinion is taken by the bearings, a bearing housing separate from and located on and secured to said valve housing, and bearings for said driving pinion secured in said bearing housing, said bearing housing having upper and lower co-operating parts, each of which contacts a bearing for said pinion.

4. A rotary valve assembly for internal combustion engines, compressors and the like comprising a housing having a conical valve seating, a rotary valve member having a stem part and a conical head at one end of the stem complementary to said conical seating, a pinion hub, longitudinal internal splines on said hub, external longitudinal splines on said stem, a pinion on said hub, a pair of bearings mounted on said hub and pinion, said hub, pinion and bearings constituting an assembled unit, a driving gear mounted laterally of said pinion in said unit, said splines being directly in mesh and permitting relative lateral and axial freedom of movement of the said stem and driving pinion so that the rotary valve member may at all times find its effective seating position whilst lateral or other thrust on the driving pinion is taken by the bearings, a bearing housing separate from and located on and secured to said valve housing, and bearings for said driving pinion secured in said bearing housing, said bearing housing having upper and lower co-operating parts, means for holding said parts together as a unit, and means on the lower part for securing the same to said valve housing.

5. A rotary valve assembly for internal combustion engines, compressors and the like comprising a housing having a conical valve seating, a rotary valve member having a stem part and a conical head at one end of the stem complementary to said conical seating, a pinion hub, longitudinal internal splines on said hub, external longitudinal splines on said stem, a pinion on said hub, a pair of bearings mounted on said hub and pinion, said hub, pinion and bearings constituting an assembled unit, a driving gear mounted laterally of said pinion in said unit, said splines being directly in mesh and permitting relative lateral and axial freedom of movement of the said stem and driving pinion so that the rotary valve member may at all times find its effective seating position whilst lateral or other thrust on the driving pinion is taken by the bearings, a bearing housing and an inwardly projecting flange thereon contacting with the upper end of said stem and constituting a guide and seal for said stem.

6. A rotary valve assembly for internal combustion engines, compressors and the like comprising a housing having a conical valve seating, a rotary valve member having a stem part and a conical head at one end of the stem complementary to said conical seating, a pinion hub, longitudinal internal splines on said hub, external longitudinal splines on said stem, a pinion on said hub, a pair of bearings mounted on said hub and pinion, said hub, pinion and bearings constituting an assembled unit, a driving gear mounted laterally of said pinion in said unit, said splines being directly in mesh and permitting relative lateral and axial freedom of movement of the said stem and driving pinion so that the rotary valve member may at all times find its effective seating position whilst lateral or other thrust on the driving pinion is taken by the bearings, and spring means above said splines biasing and maintaining axial alinement of said pinion and valve.

7. A rotary valve assembly for internal combustion engines, compressors and the like comprising a housing having a conical valve seating, a rotary valve member having a stem part and a conical head at one end of the stem complementary to said conical seating, a pinion hub, longitudinal internal splines on said hub, external longitudinal splines on said stem, a pinion on said hub, a pair of bearings mounted on said hub and pinion, said hub, pinion and bearings constituting an assembled unit, a driving gear mounted laterally of said pinion in said unit, said splines being directly in mesh and permitting relative lateral and axial freedom of movement of the said stem and driving pinion so that the rotary valve member may at all times find its effective seating position whilst lateral or other thrust on the driving pinion is taken by the bearings, a bearing housing separate from and located on and secured to said valve housing, said bearings for said driving pinion contacting with said bearing housing, the upper bearing being on the inner face of said pinion and the lower bearing being on the outer face of said hub below said pinion.

FRANK METCALF ASPIN.